(12) United States Patent
Boden et al.

(10) Patent No.: US 7,401,354 B2
(45) Date of Patent: Jul. 15, 2008

(54) SYSTEM AND METHOD FOR NETWORK ADDRESS TRANSLATION INTEGRATION WITH IP SECURITY

(75) Inventors: Edward B. Boden, Vestal, NY (US); Franklin A. Gruber, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/386,989

(22) Filed: Mar. 12, 2003

(65) Prior Publication Data

US 2003/0149899 A1    Aug. 7, 2003

Related U.S. Application Data

(62) Division of application No. 09/240,720, filed on Jan. 29, 1999, now Pat. No. 6,615,357.

(51) Int. Cl.
*G06F 9/00* (2006.01)
*H04L 9/00* (2006.01)

(52) U.S. Cl. .......................... 726/11; 380/277; 713/150

(58) Field of Classification Search .................. 726/11, 726/15; 713/151, 150; 380/277
See application file for complete search history.

(56) References Cited

U.S. PATENT DOCUMENTS

| | | | |
|---|---|---|---|
| 5,550,984 A | 8/1996 | Gelb ...................... 395/200.17 |
| 5,640,456 A | 6/1997 | Adams, Jr. et al. ............ 380/49 |
| 5,757,924 A | 5/1998 | Friedman et al. .............. 380/49 |
| 5,761,201 A | 6/1998 | Vaudreuil .................... 370/392 |
| 5,793,763 A | 8/1998 | Mayes et al. ................. 370/389 |
| 5,825,891 A | 10/1998 | Levesque et al. ............. 380/49 |
| 5,828,893 A | 10/1998 | Wied et al. .................. 395/800 |
| 5,835,726 A | 11/1998 | Shwed et al. .......... 395/200.59 |
| 6,047,325 A * | 4/2000 | Jain et al. .................... 709/227 |
| 6,055,236 A * | 4/2000 | Nessett et al. ............... 370/389 |
| 6,157,955 A * | 12/2000 | Narad et al. ................. 709/228 |
| 6,182,226 B1 * | 1/2001 | Reid et al. ..................... 726/15 |
| 6,226,751 B1 * | 5/2001 | Arrow et al. .................. 726/15 |
| 6,266,707 B1 | 7/2001 | Boden et al. ................. 370/401 |
| 6,353,614 B1 * | 3/2002 | Borella et al. ............... 370/389 |

(Continued)

FOREIGN PATENT DOCUMENTS

GB        2317792 A  *  4/1998

OTHER PUBLICATIONS

Business Wire: VPN Leader RADGUARD and Systems Integration Giant Vanstar Join; Jun. 22, 1998 LookSmart.*

(Continued)

*Primary Examiner*—Emmanuel L Moise
*Assistant Examiner*—Techane J Gergiso
(74) *Attorney, Agent, or Firm*—Shelley M. Beckstrand

(57) ABSTRACT

IP security is provided in a virtual private network using network address translation (NAT) by performing one or a combination of the three types of VPN NAT, including VPN NAT type a outbound source IP NAT, VPN NAT type c inbound source IP NAT, and VPN NAT type d inbound destination IP NAT. This involves dynamically generating NAT rules and associating them with the manual or dynamically generated (IKE) Security Associations, before beginning IP security that uses the Security Associations. Then, as IP Sec is performed on outbound and inbound datagrams, the NAT function is also performed.

11 Claims, 7 Drawing Sheets

U.S. PATENT DOCUMENTS

| | | | |
|---|---|---|---|
| 6,353,886 B1 * | 3/2002 | Howard et al. | 713/156 |
| 6,493,349 B1 * | 12/2002 | Casey | 370/409 |
| 6,510,154 B1 * | 1/2003 | Mayes et al. | 370/389 |
| 6,697,354 B1 * | 2/2004 | Borella et al. | 370/352 |
| 6,701,437 B1 * | 3/2004 | Hoke et al. | 726/15 |

OTHER PUBLICATIONS

"Virtual Private Networks on Vendor Independent Networks", *IBM Technical Disclosure Bulletin*, vol. 35, No. 4A, Sep. 1992, pp. 326-329.

The Microsoft Press Computer Dictionary, 3rd Ed., Microsoft Press, p. 272.

S. Kent and R. Atkinson, Network Working Group, Request for Comments (RFC) 2401, *Security Architecture for the Internet Protocol*, Nov. 1998, 66 pages.

K. Egevang and P. Francis, Network Working Group, Request for Comments (RFC) 1631, *The IP Network Address Translator (NAT)*, May 1994, 10 pages.

* cited by examiner

SYSTEM AND METHOD FOR NETWORK ADDRESS TRANSLATION INTEGRATION WITH IP SECURITY

CROSS REFERENCES TO RELATED APPLICATIONS

This application is a divisional of U.S. patent application Ser. No. 09/240,720 filed 29 Jan. 1999, now U.S. Pat. No. 6,615,357 B1, issued 2 Sep. 2003, by Edward B. Boden and Franklin A. Gruber for System and Method for Network Address Translation Integration With IP Security.

U.S. patent applications Ser. No. 09/239,693, entitled System and Method for Managing Security Objects, now U.S. Pat. No. 6,330,562, issued 11, Dec. 2001; Ser. No. 09/240,718, entitled "System and Method for Dynamic Macro Placement of IP Connection Filters"; Ser. No. 09/239,694, entitled "System and Method for Dynamic Micro Placement of IP Connection Filters", now U.S. Pat. No. 6,643,776 B1, issued 4 Nov. 2003 09/240,483, entitled "System and Method for Central Management of Connections in a Virtual Private Network, now U.S. Pat. No. 6,636,898 B1, issued 21 Oct. 2003 , filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to security over virtual private network (VPN) connections. More particularly, it relates to VPN NAT, or concurrent use of network address translation (NAT) and IP Security (IPSec) protocols.

2. Background Art

Network Address Translation (NAT), widely deployed in Internet and in companies connecting to the Internet, causes problems for IP Security. (See U.S. Pat. No. 6,636,898 B1, cited above, at Col. 7, line 20 to Col. 8, line 46; S. Kent and R. Atkinson, Network Working Group, Request for Comments (RFC) 2401, *Security Architecture for the Internet Protocol*, Nov. 1998 and K. Egevang and P. Francis, Network working Group, Request for Comments (RFC) 1631, *The IP Network Address Translator (NAT)*, May 1994.) In fact, NAT breaks IP Security (IP Sec) . That is, NAT "is the feature which finally breaks the semantic overload of the IP address as both a locator and the end-point identifier". As a result, two hosts cannot establish an IP Sec connection if there is a NAT system in between. There are two reasons why.

First, the IP traffic that flows between the two hosts (for the IP Sec connection) will have Authentication Header (AH) or Encapsulating Security Payload (ESP) applied (See RFC 2401, cited above) . With respect to ESP in tunnel mode, the IP address that needs to be translated is inside the ESP tunnel and is encrypted. It is, therefore, unavailable to NAT. With respect to AH in transport or tunnel mode, the IP address that needs to be translated is visible in NAT, but the AH authentication includes it. Therefore, changing the IP address will break the authentication at the remote end of the IP Sec connection. With respect to ESP in transport mode, even if ESP is used with authentication, the IP address is available to NAT. But, if the IP address is changed, the IP Sec connection breaks due to the breaking of authentication at the remote end of the IP Sec connection.

Second, even if the IP traffic for the IP Sec connection could be translated, it would fail because the IP Sec connection is based on Security Associations which contain the two host IP addresses. An SA is an Internet Key Exchange (IKE) which defines the IPSec domain of interpretation of an IKE framework unidirectional security protocol specific set of parameters that defines the services and mechanism necessary to protect traffic between two nodes (see RFC 2401 and U.S. Pat. No. 6,330,562 B1 at Col. 2, lines 3-8, cited above) . These two host IP addresses are fundamental to the Security Association architecture, in that the inbound IP Sec, on the host where decrypting (or authentication) is to occur, must be uniquely determined by the triple: {destination IP addr, SPI, IP Sec protocol}.

For example, given hosts A & W, assume NAT is applied to an IP datagram (a generic term for bytes that go on the wire) with ESP in transport mode that is going from A to W. Hence the IP source address is changed. Upon arrival at W, the packet will probably be decrypted successfully since that doesn't depend on IP source address (which was in plaintext—not tunneled). If strictly implemented however, the inbound SPD checking which should follow decrypting will fail, due to the changed IP source address (because it was not the address used to negotiate the security association). So, even the transport mode ESP case fails.

Simply making NAT and IP Sec mutually exclusive is not the solution sought by the art. NAT is being deployed widely because it solves many problems, such as: masks global address changes, lowers address utilization, lowers ISP support burden, allows load sharing as virtual hosts. Yet, NAT is viewed as the greatest single threat to security integration being deployed in the Internet today. This "NAT problem", as it is invariably termed, is architecturally fundamental. Yet, legacy applications and services (for example, those developed for IP version 4) will continue to a long co-existence as applications and services develop for IP version 6. Consequently, there is a great need in the art for providing NAT and IP Sec coexistence, at least in selected situations, and to do so without introducing serious configuration problems.

A VPN connection between two address domains can have the effect of directly connecting the two domains, which most likely will not been planned to be connected. Hence increased use of VPNs is likely to increase address conflicts. It is also understood that VPNs redefine network visibility and increase the likelihood of address collision when traversing NATs. Address management in the hidden space behind NATs will become a significant burden. There is, therefore, a need in the art to ameliorate that burden.

It is an object of the invention to provide an improved system and method for concurrently implementing both Network Address Translation (NAT) and IP Security (IP Sec).

It is a further object of the invention to provide a system and method for solving the increased likelihood of IP address conflicts inherent in the use of a virtual private network (VPN).

It is a further object of the invention to provide a system and method for enabling utilization of VPNs without requiring re-addressing a domain (an expensive alternative).

It is a further object of the invention to provide a system and method for VPN NAT which is accomplished entirely in the IP Sec gateway without require changes in domain hosts.

It is a further object of the invention to provide a system and method for VPN NAT which requires no, or only minor changes to routing, in each connected domain.

It is a further object of the invention to provide a system and method for VPN NAT which is simple to configure.

It is a further object of the invention to provide a solution to the address collision problems caused by VPNs.

SUMMARY OF THE INVENTION

In accordance with the invention, IP security is provided in a virtual private network using network address translation (NAT) by performing one or a combination of the three types of VPN NAT. This involves dynamically generating NAT rules and associating them with the manual or dynamically generated (IKE) Security Associations, before beginning IP security that uses the Security Associations. Then, as IP Sec is performed on outbound and inbound datagrams, the NAT function is also performed.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, the NAT problem is addressed through two functions: VPN NAT, and Prefer IP Sec.

Pursuant to Prefer IP Sec, to avoid dysfunctional IP Sec connections with the accidental use of HIDE and MAP NAT rules (aka conventional NAT), AH or ESP is checked for during conventional NAT. If a given NAT rule would apply to the IP packet, except for the AH or ESP header, address translation will not be done. This applies to inbound and outbound NAT. So, the effect is that for conventional NAT (versus VPN NAT for IP Sec, or IP Sec NAT), preference is given to IP Sec. IP Sec overrides conventional NAT.

Since it is not known at the time the NAT rules are loaded whether or not any IP Sec connections might conflict (dynamic IP for example), checking for such problems cannot be done until actual NAT processing in SLIC. User visibility to these actions is provided, if journaling is on for the rule, by indicating in a journal entry that a NAT rule fit the datagram, but was not done due to IP Sec. In addition, LIC information logging of these actions may be provided for some limited number of occurrences per conventional NAT rule. Similarly, a message per connection, rather than per occurrence, may be provided in a connection manager job log or in a connection journal.

Pursuant to the present invention, referred to as VPN NAT, to allow NAT to be used with IP Sec at the IP Sec gateway, customers retain private internal IP addresses and increased address collision is avoided by having IP Sec connections begin and end at the IP Sec gateway.

In accordance with the preferred embodiment of the invention, virtual private networks (VPN) are provided in both initiator and responder modes with an integrated NAT function. Security associations are negotiated using the proper external (NAT rhs) IP addresses, and the NATing of corresponding internal (NAT lhs) IP addresses is done by generated NAT rules, in sync with connection load to IPsec and IPSec processing in SLIC. Inbound source IP addresses are translated, as well as the usual source IP address NAT on outbound (with corresponding translation of destination IP address on inbound).

Figure 1:
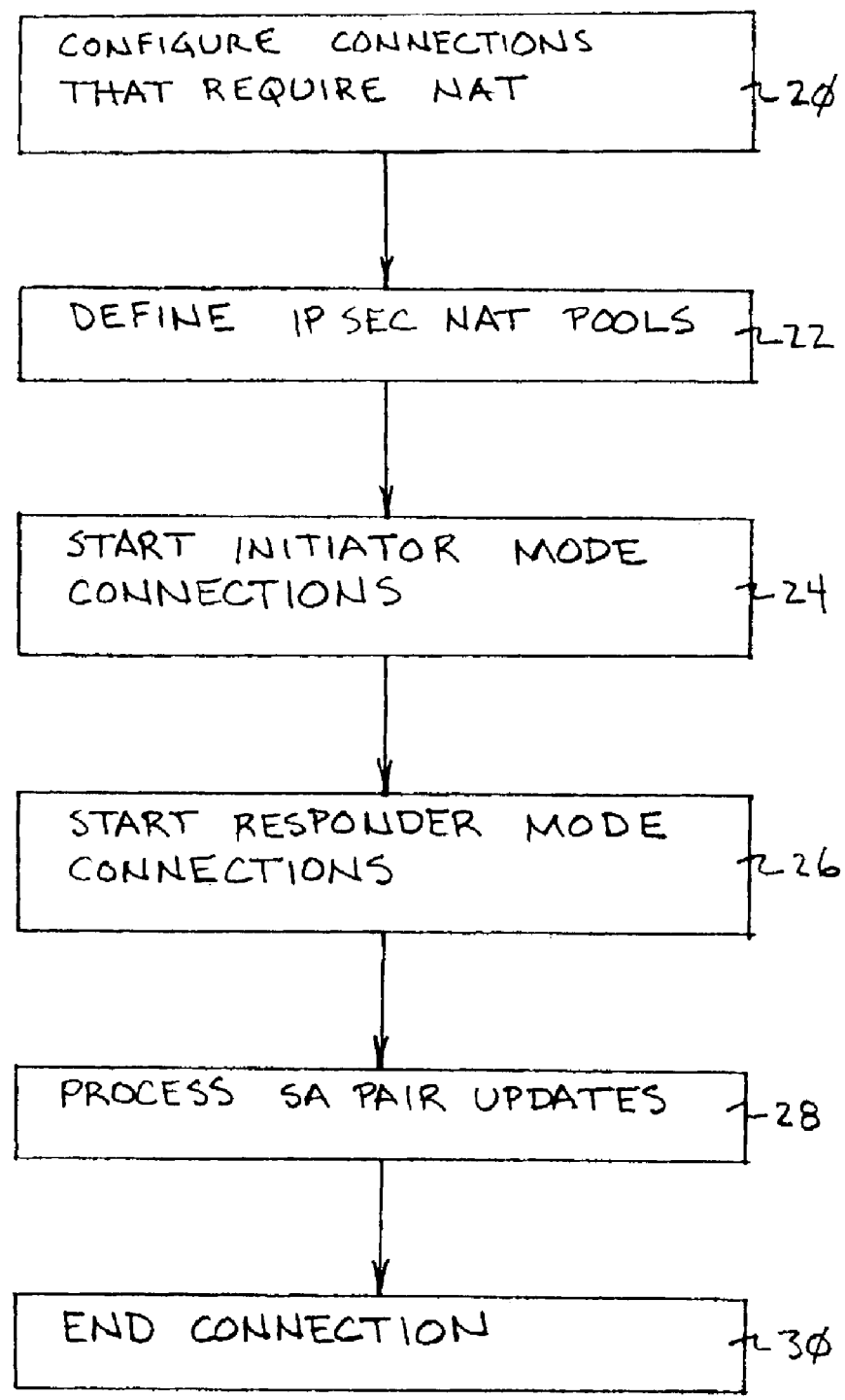
FIG. 1 is a flow diagram of the VPN NAT method of the preferred embodiment of the invention.

Referring to FIG. 1, the method of the preferred embodiment of the invention for executing VPN NAT includes in step 20 configuring connections that require NAT, in step 22 defining IPSec NAT pools, in step 24 starting initiator mode connections, in step 26 starting responder mode connections (these are generally started at the other end of the connection), in step 28 processing SA pair updates, and in step 30 ending the connections. (A NAT pool is a set of IP addresses.) Each of these steps is further explained below.

In step 20, the user decides on and configures the connections that will require NAT. This is logically equivalent to writing NAT rules. The four cases to be considered in doing so are depicted in Table 1.

TABLE 1

| | TYPES OF VPN NAT | |
|---|---|---|
| | IDci | IDcr |
| initiator mode | type a. NAT internal address, IP src on outbound, IP dest on inbound. | type b. n/a, because is externally defined. |
| responder mode | type c. NAT external address, IP src on inbound, IP dest on outbound. | type d. NAT internal address, IP dest on inbound, IP src on outbound |

When specifying a specific instance of NAT in, for example, an IP Sec Policy database, the user makes a yes/no decision in, say, a check-box. Responder mode NAT flags IDci and IDcr may be part of the connection definition. The initiator mode flag may be part of the user client pair, associated with a 'local client ID' (only). The responder IDci and IDcr NAT flags can be set independently. Both are relevant only if connection definition has external initialization mode.

In all cases, if the NAT flag is 'on', the corresponding granularity value should be 's' (scalar) in the connection definition.

Figure 2:
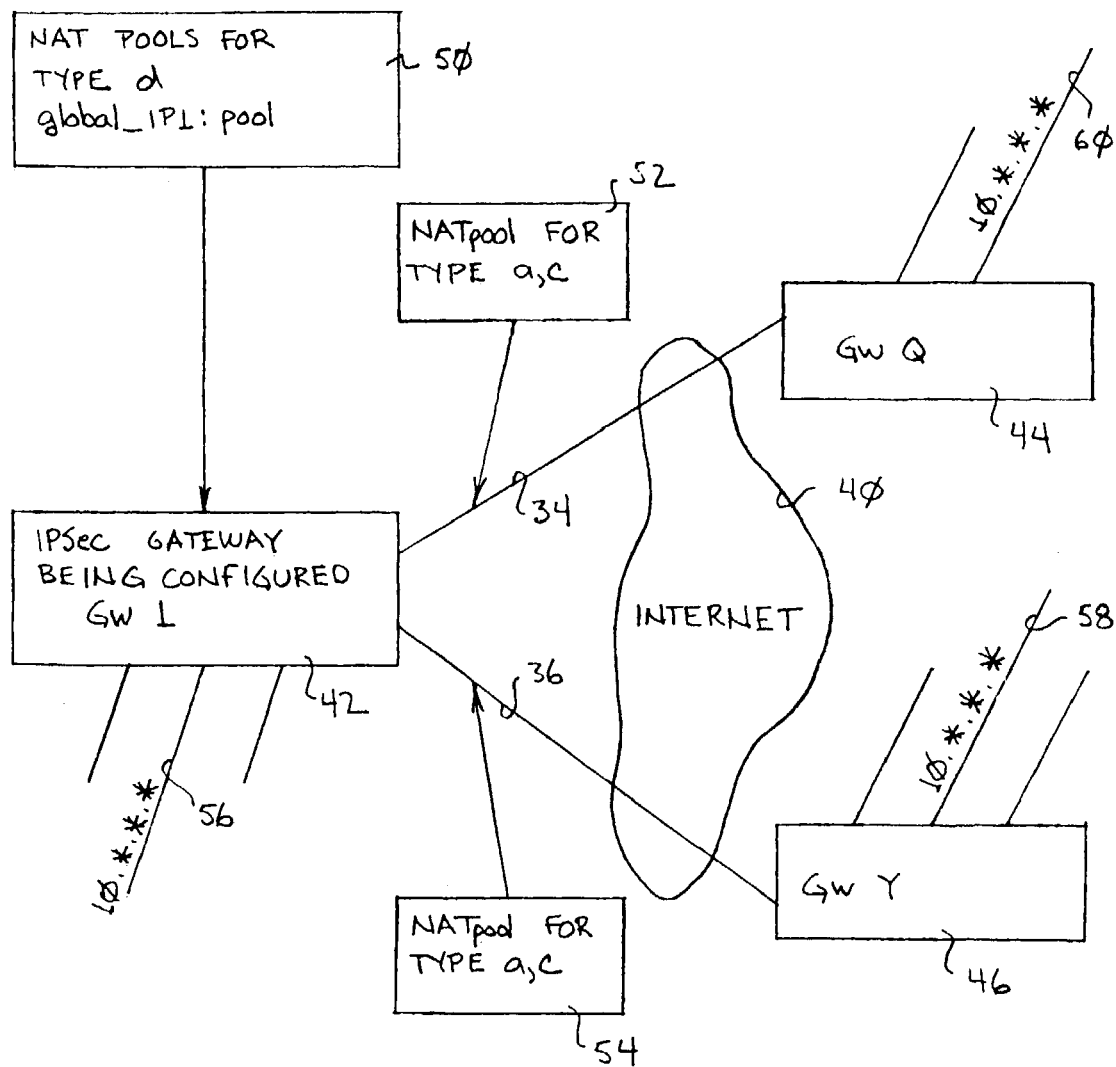
FIG. 2 illustrates typical IP Sec scenarios and associated VPN NAT pools.

Referring to FIG. 2, the manner in which VPN NAT IP pools relate to network scenarios is shown. Lines 34 and 36 represent IP Sec connections between gateways (GW) 42, 44 and 46 on Internet 40. NAT pools 52, 54 for types a and c are independently associated with each remote ID (gateway 42, 44, 46). For type d VPN NAT, a single pool 50 may defined for global IP address that the VPN NAT gateway 42 owns. In this example, all three internal networks 56, 58 and 60 use the same 10.*.*.* addresses space. This provides the initial value and motivation for VPN NAT: IP Sec tunnels (aka connections) between these internal networks 56, 58, 60 has a logical effect combining them. This cannot be done, in general, without address conflict. VPN NAT provides the solution to the problem presented to gateway (Gw 1) 42 when it needs to do business with hosts behind gateways Gw Q 44 and Gw Y 46 on internal networks 60 and 58, respectively.

In step 22, the user defines a set (in pools 50, 52 and 54) of IP addresses that are available for the exclusive use of the VPN NAT function. Each pool is preferably definable as a range of IP address, and is naturally associated with remote ID and local ID IP Sec Policy database entities. That is, for each remote ID DB entry and also for each local ID DB entry, the user may optionally specify two IP addresses.

Referring to Table 2, the different meanings of each flavor of VPN NAT motivating the different pools are set forth. Although specified on a per remote ID or local ID basis, the pools may be managed as three distinct groups of IP addresses. This allows the user to specify, for example, the same range for multiple remote ID's. The letters a, c and d correspond to the VPN NAT types (Table 1). The column 'lr?' means locally routable (as distinguished from globally routable.)

TABLE 2

IP SEC NAT POOLS

| IP Sec NAT pools | Pool purpose | Effective generated outbound NAT rule | lr? |
|---|---|---|---|
| a. 'L' connections, translate IDci (src on IP addr on outbound) | 1. Hide own IP addresses from remote GW and hosts (same motivation as conventional NAT).<br>2. Avoid IP address conflict with remote GW and its networks (new potential problem created by VPN). Hence, a pool may be associated with each remote ID. | "MAP srcIP TO <value from pool>". NAT srcIP obtained from user client pair, 'Local Client ID'. | yes |
| c. 'R' connections, translate IDci (src IP addr on in-bound). | Avoid IP addr conflict with remote GW and its networks (new potential problem created by VPN). Hence, a pool may be associated with each remote ID. | "MAP destIP TO <value from pool>". NAT destIP obtained from ISAKMP IDci. | yes |
| d. 'R' connections, translate IDcr (dest IP addr on in-bound). | 1. Provide a form of load sharing from single external, globally routable IP address to a set of servers.<br>2. Hide own IP addresses behind external address. Hence, a pool may be associated with a globally routable IP address (IDcr). | "MAP srcIP TO <value from pool>". NAT srcIP obtained from ISAKMP IDcr. | yes |

In step 24, initiator mode connections are started. When starting an initiator mode connection, the connection manager checks if the local client ID is to be translated. If so, the connection manager looks for an available IP address from NAT pool, say 52, associated with a remote ID in the database. Availability is determined by the connection manager as follows; it maintains a single (system-wide, since connection manager runs once per system) list of IP addresses that have been used in some active connection (states: starting, running or stopped) from any a-type pool (see Table 1). The first IP address in the pool not in the used list, is chosen, and added to the used list. If an available IP address cannot be found, the connection is not started and an appropriate error message (and possibly return code to the OP NAV GUI) is generated. The policy database is not updated to show an IP address is in use—rather this is determined dynamically by the connection manager based solely on its set of active connections.

The start message (msg) sent by connection manager to ISAKMP will have NAT rhs IP address selected from the pool. The NAT rhs IP address is added to the SA pair, which is completed by the returned SAs from ISACMP. Connection manager the loads the connection to IPSec.

IPSec generates NAT rules for the two SAs. On outbound, NAT will occur after filtering and before IPSec and on inbound, NAT will occur after IPSec (and before filtering). In this case, NAT is wrapping the local end of the IPSec connection.

Figure 3:
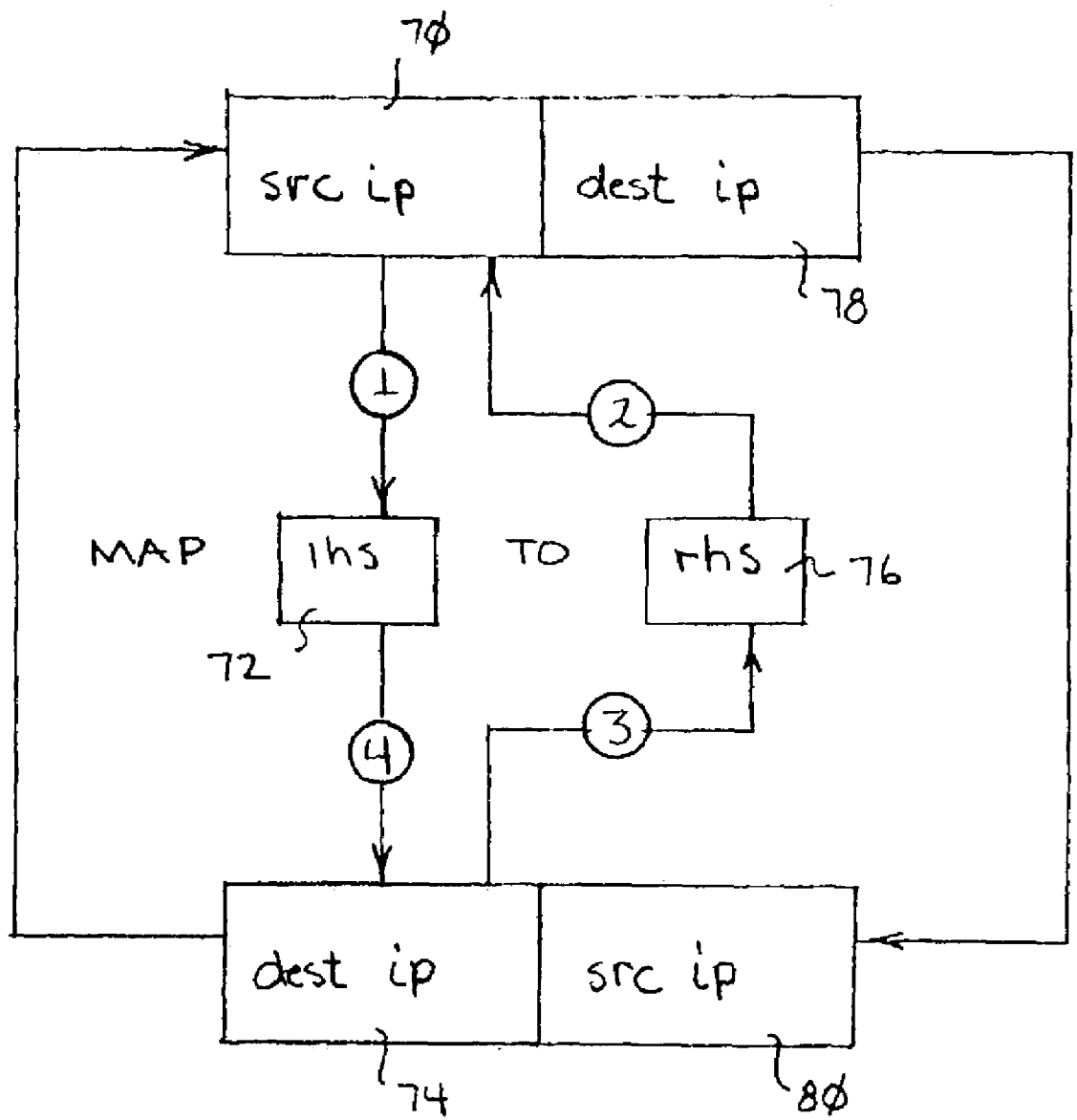
FIG. 3 illustrates static NAT, the simplest conventional NAT.
Figure 4:
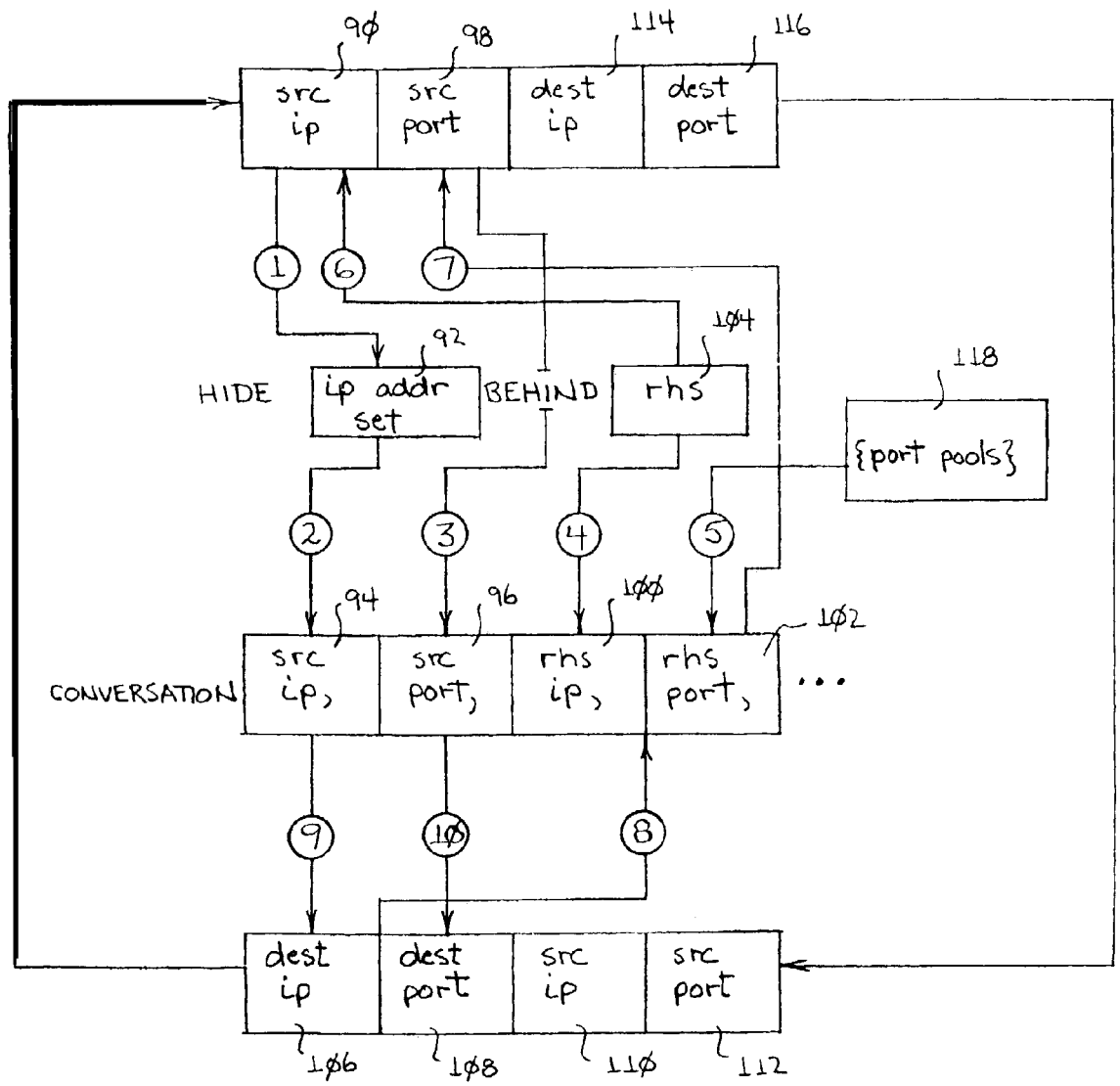
FIG. 4 illustrates masquerade NAT, a type of conventional NAT.

Referring to FIGS. 3 and 4, conventional NAT functions are illustrated for background and contrast with later figures which show VPN NAT types according to the invention.

Referring to FIG. 3, static is the simplest form of NAT. Both conventional NAT types are explicitly configured by the user by writing the corresponding NAT rule statements via the OpNat GUI. This is in contrast to the IPSec NAT, in which the actual NAT rules or statements are generated by the system. The MAP statement <MAP lhs TO rhs> and HIDE statement <HIDE ip addr set BEHIND rhs> are such statements.

Again referring to FIG. 3, on inbound processing, if source ip 70 matches lhs 72 in the MAP lhs TO rhs statement, then src ip 70 is translated to rhs 76. On outbound processing, if destination ip 74 matches rhs 76, then destination ip 74 is translated to lhs 72.

Referring to FIG. 4, masquerade NAT (also referred to as network address and port translation (NAPT)), uses the HIDE statement, supra, and provides many-to-one address translation by using its own port pools 118 (UDP, TCP) to remember how to translate the inbound traffic. Unlike static NAT (FIG. 3), masquerade NAT conversations <CONVERSATION src ip, src port, rhs ip, rhs port, . . . > can only be initiated by internal (lhs) addresses. VPN NAT, a name used to identify the preferred embodiment of the present invention, as will be seen, is closer to static NAT, in that it does not include port translation.

Referring further to FIG. 4, in processing outbound datagrams, in step <1> if source ip address 90 is in the ip address set 92 of the HIDE statement, then in step <2> the CONVERSATION is set up by copying src ip 90 into CONVERSATION field 94, in step <3> source port 98 into field 96, in step <4> rhs 104 into field 100, and in step <5> the rhs port into field 102 from the correct pool in port pools 118. Then, in step <6> source ip 90 is translated to rhs 104, and in step <7> source port 98 is changed to rhs port 102. In processing inbound datagrams, if in step <8> destination ip address 106 and destination port 108 match CONVERSATION fields rhs ip 100 and rhs port 102, respectively, then in step <9> destination ip address 106 is translated to CONVERSATION source ip address 94 and in step <10> destination port 108 is translated to CONVERSATION source port 96.

Some special situations also handled by NAT are not illustrated because they are of no interest to the present invention. These include handling of special situations created by FTP or ICMP, both of which contain IP address that are translated. Checksum re-calculation is done. In masquerade NAT once a conversation exists, later datagrams are matched against that, rather than the original (precipitating) HIDE rule, the port pools are managed, conversations are timed and terminated, and ports are mapped. It is a particular advantage of the invention that VPN NAT supports ICMP and FTP (including the famous FTP PORT command and attendant problems).

Figure 5:
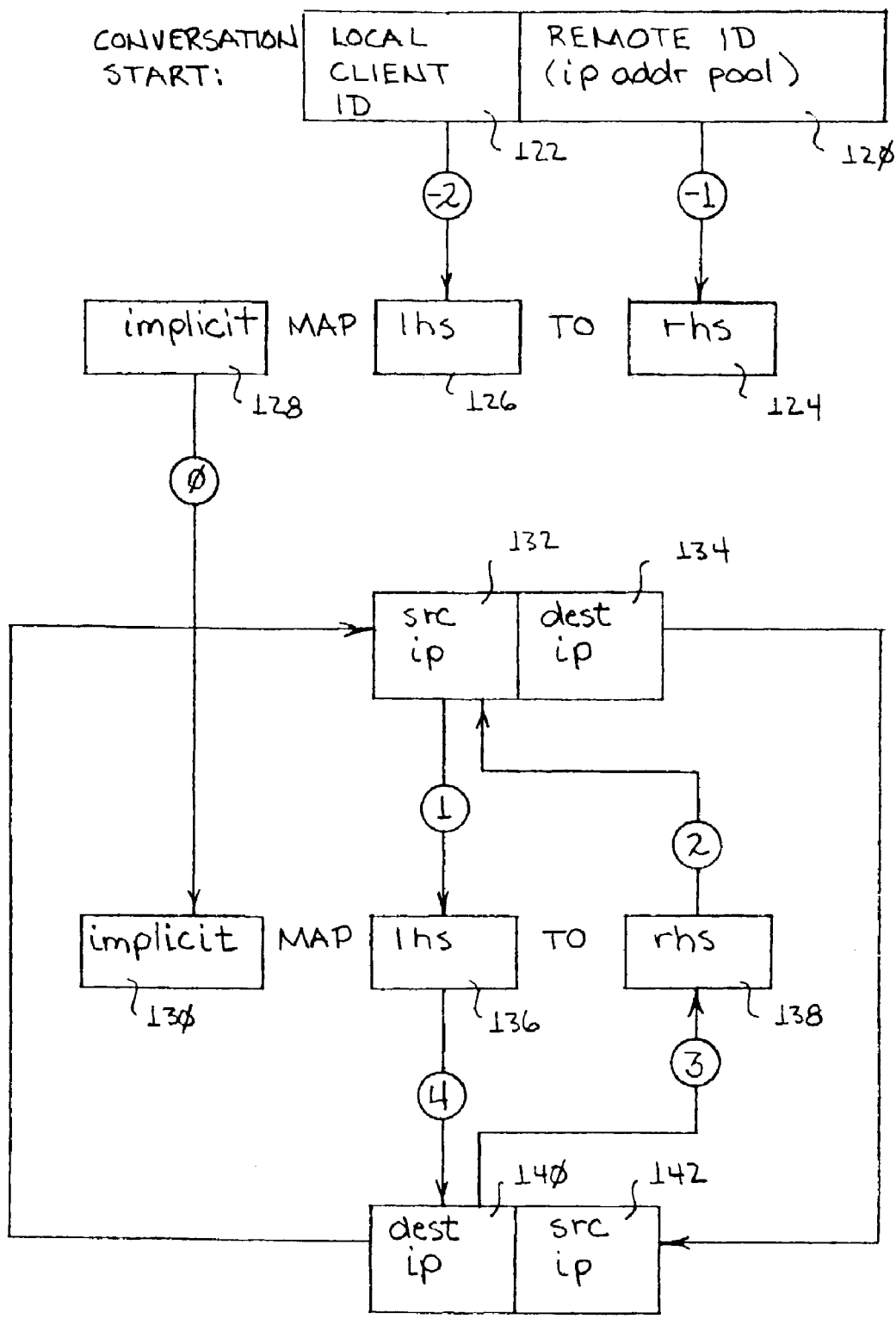
FIG. 5 illustrates VPN NAT, type a: IDci translated for initiator-mode conversations.

Referring to FIG. 5, the preferred embodiment of the invention for VPN NAT type 'a' is illustrated. In VPN NAT, type 'a', IDci is translated for initiator-mode conversations. After system generated implicit NAT rule 128 <MAP lhs TO rhs> is loaded, it functions as static NAT. The key to making this work, is that the security associations negotiated by ISAKMP use the implicit MAP 130 rhs 138. Hence, the SAs and the VPN NAT are synchronized.

Referring further to FIG. 5, for a locally initiated conversation, in step <−2>, since NAT is requested, implicit MAP rule 128 is created by copying local client ID 122 to lhs 126 and the ip address 120 is obtained from the appropriate pool and copied to rhs 124. In step <0>, after ISAKMP negotiation is complete using rhs 124, implicit MAP rule 130 is loaded. For outbound processing, if in step <1> src ip 132 matches lhs 136, then in step <2> src ip is translated to rhs 138. For inbound processing, if in step <3> dest ip address 140 matches rhs 138, then in step <4> destination ip 140 is translated to lhs 136.

In step 26, responder mode connections are started. In so doing, ISAKMP functions negotiates the SAs based on currently configured policy. When done, they are sent to the connection manager as a SA collection of 1 to n SA pairs.

Figure 6:
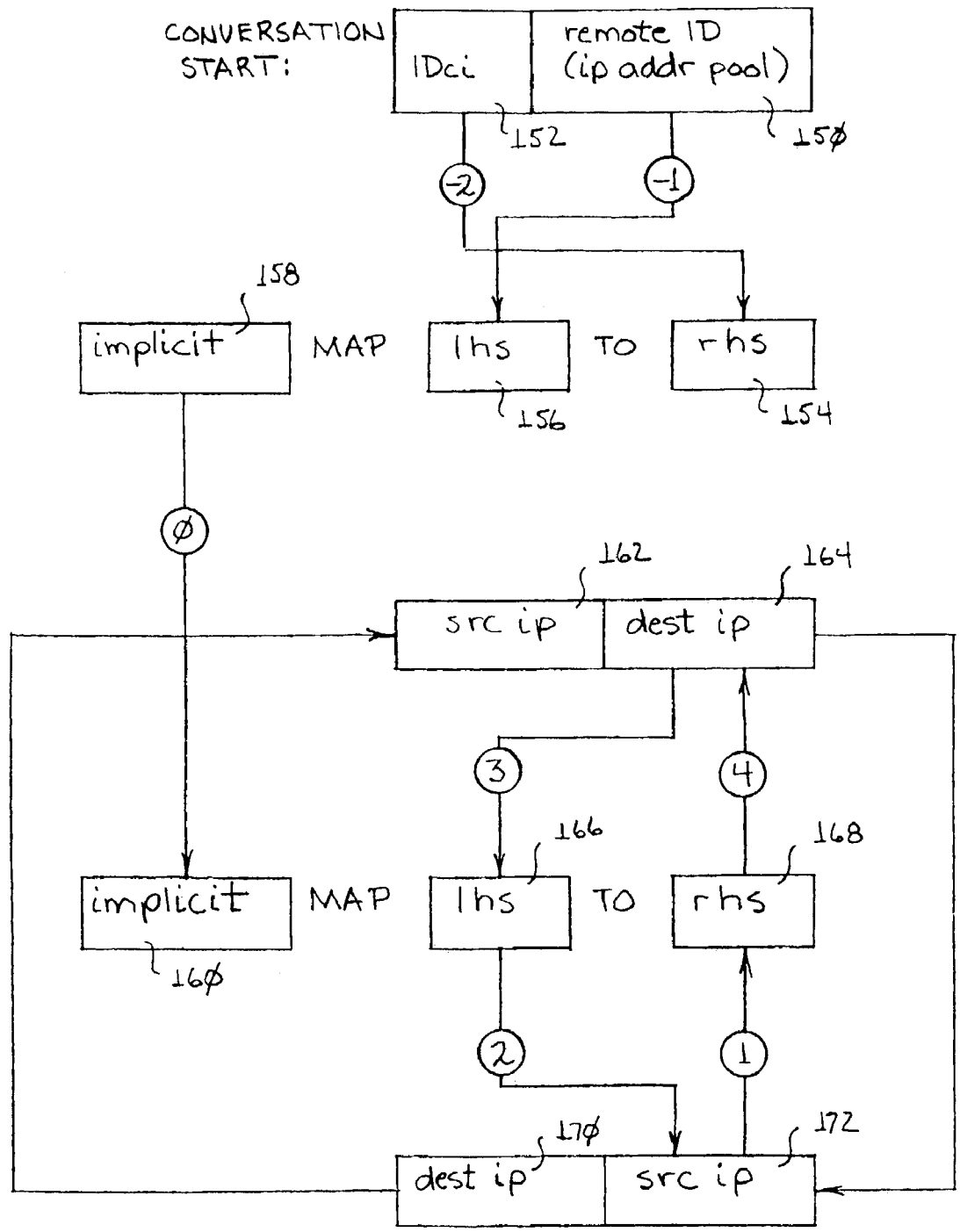
FIG. 6 illustrates VPN NAT, type c: IDci translated for responder-mode conversations.
Figure 7:
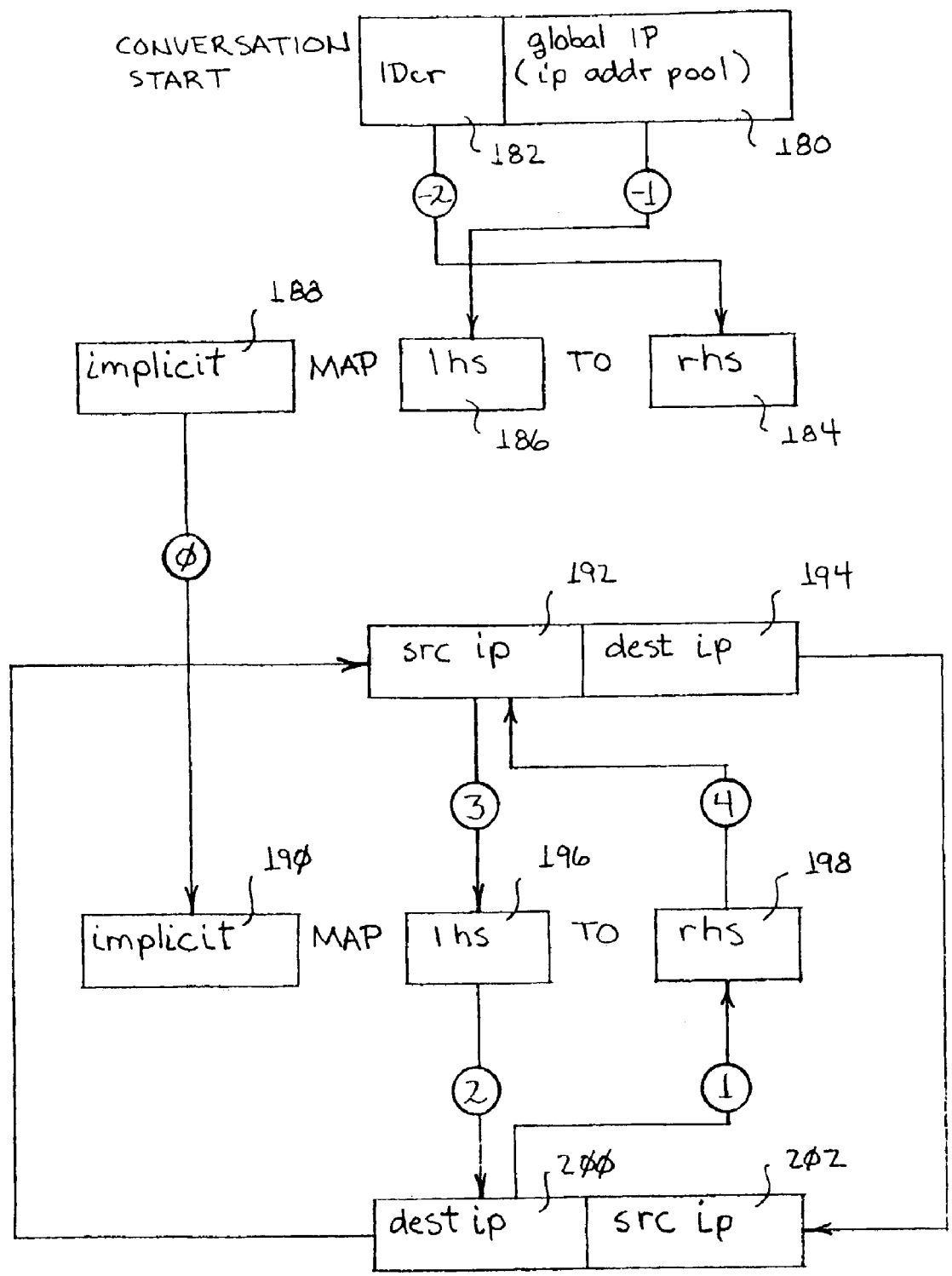
FIG. 7 illustrates VPN NAT, type d: IDcr translated for responder-mode conversations.

The connection manager, upon receiving the start message (msg) from ISAKMP, looks at the connection definition in the database and checks the IDcr and IDci NAT flags. If NAT remote flag is 'on', then an IP address is obtained from the appropriate NAT pool associated with the remote ID. If the NAT local flag is 'on', then an IP address is obtained from the pool associated with IDcr (a global address). In FIGS. 6 and 7, VPN NAT types 'c' and 'd' are illustrated.

Management of IP address availability from the remote ID pool is done by the connection manager based on its set of active connections (as for type 'a' VPN NAT). Connection manager also handles availability for the IDcr pool, which allows load balancing. The IDcr pool is a set of IP addresses for nat'ing IDcr. There are two basic approaches: (1) for every start search the pool from the first entry; or, (2) for every start, the pool is searched from the last used IP.

The load to IPSec occurs as in the initiator mode case above. When processing R-type connection traffic (in connection name, first byte of serial is "R"), two address translations may occur for each inbound and outbound packet (source and destination).

Referring to FIG. 6, VPN NAT type 'c' executes to translate IDci for responder-mode conversations as follows: in step <−2>, for remotely initiated conversations, at start, since NAT is requested, implicit MAP rule 158 <MAP ihs TO rhs> is created, copying IDci 152 to rhs 154. In step <−1>, the ip address is obtained from the appropriate pool 150 and copied to lhs 156. In step <0>, after ISAKMP negotiation is complete using rhs 154, implicit rule 160 is loaded. When processing inbound datagrams, if in step <1> src ip 172 matches rhs 168, in step <2> source ip 172 is translated to lhs 166. When processing outbound datagrams, if in step <3> destination 164 matches lhs 166, in step <4> destination ip 164 is translated to rhs 168.

Referring to FIG. 7, VPN NAT type 'd' executes to translate IDcr for responder-mode conversations as follows: in step <−2>, for remotely initiated conversations, at start, since NAT requested, implicit MAP rule 188 is created, copying IDcr 182 to rhs 184. In step <−1>, the ip address is obtained from appropriate address pool 180 and copied to lhs 186. In step <0>, after ISAKMP negotiations are completed using rhs 184, implicit MAP rule 190 is loaded. When processing inbound datagrams, if in step <1> destination ip 200 matches rhs 198, in step <2> destination ip 200 is translated to lhs 196. When processing outbound datagrams, if in step <3> source ip 192 matches lhs 196, in step <4> source ip 192 is translated to rhs 198.

In step 28, when the connection manager gets SA pair updates, it copies any NAT IP addresses in existing SA pairs to the new SA pair.

In step 30, when ending a connection, the connection manager frees (makes available) any NAT IP addresses associated with the connection. NAT IP addresses are removed from the appropriate list maintained by the connection manager.

ADVANTAGES OVER THE PRIOR ART

It is an advantage of the invention that there is provided an improved system and method for concurrently implementing both Network Address Translation (NAT) and IP Security (IP Sec).

It is a further advantage of the invention that there is provided a system and method for solving the increased likelyhood of IP address conflicts inherent in the use of a virtual private network (VPN).

It is a further advantage of the invention that there is provided a system and method for enabling utilization of VPNs without requiring re-addressing a domain (a expensive alternative).

It is a further advantage of the invention that there is provided a system and method for VPN NAT which is accomplished entirely in the IP Sec gateway without require changes in domain hosts.

It is a further advantage of the invention that there is provided a system and method for VPN NAT which requires no, or only minor changes to routing, in each connected domain.

It is a further advantage of the invention that there is provided a system and method for VPN NAT which is simple to configure.

It is a further advantage of the invention that there is provided a solution to the address collision problems caused by VPNs.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method of operating a virtual private network (VPN) based On IP Sec that integrates network address translation (NAT) with IPSec processing, to enable two hosts operating in AH or ESP, and in tunnel or transport, modes to establish an IPSec connection across a NAT system, comprising the steps of:

operating said two hosts in AH or ESP, and in tunnel or transport, modes;

configuring a plurality of NAT IP address pools and a VPN connection to utilize one of said plurality of NAT IP address pools;

obtaining a specific IP address from a correct one of said NAT IP address pools, and allocating said specific IP address for said VPN connection prior to execution of an Internet Key Execution (IKE) protocol; a correct pool being determined by type of VPN connection that is starting;

responsive to said allocating step, starting said VPN connection, including executing said IKE protocol to generate two local IPSec security associations required for said VPN connection and creating a message for IKE containing said IP address from said NAT pool;

loading to an operating system kernel said IPSec security associations and connection filters for said VPN connection;

responsive to loading said IPSec security associations and connection filters for said VPN connection, processing an IP datagram for said VPN connection and applying VPN NAT to said IP datagram.

2. The method of claim 1, wherein said VPN connection is configured for outbound processing, and said applying step comprises outbound source IP NATing.

3. The method of claim 1, wherein said VPN connection is configured for some combination of inbound processing, and said applying step selectively comprises inbound source IP NATing or inbound destination IP NATing.

4. The method of claim 1, farther comprising integration of NAT with IPSec for manually-keyed IPSec connections, including further step of manually configuring connection keys.

5. The method of claim 1, further comprising integrating NAT with IPSec for dynamically-keyed IPSec connections, including a further step of configuring the VPN Connections to obtain their keys automatically.

6. The method of claim 1, further comprising integrating NAT with IPSec Security Associations, negotiated dynamically by IKE, wherein said starting step including a further step of creating a message for IKE containing said IP address from said NAT pool; and operating IKE to obtain dynamically negotiated keys.

7. The method of claim 6, further comprising the step of combining the dynamically obtained keys with said NAT pool IP address and wherein said loading step loads the result as security associations into said operating system kernel.

8. A program storage device readable by a machine, tangibly embodying a program of instructions executable by a machine to perform method steps for operating a virtual private network (VPN) based on IPSec that integrates network address translation (NAT) with IPSec processing to enable two hosts operating in AH or ESP, and in tunnel or transport, modes to establish an IPSec connection across a NAT system, said method steps comprising:

operating said two hosts in AH or ESP, and in tunnel or transport, modes;

configuring a plurality of NAT IP address pools and a VPN connection to utilize one of said NAT IP address pools;

obtaining a specific IP address from a selected correct one of said NAT IP address, and allocating said specific IP address for said VPN connection prior to execution of an Internet Key Execution (IKE) protocol; a correct pool being determined by type of VPN connection that is starting;

responsive to said allocating step, starting said VPN connection, including executing said IKE protocol to generate two local IPSec Security Associations security associations required for said VPN connection and creating a message for IKE containing said IP address from said NAT pool;

loading to an operating system kernel said IPSec security associations and connection filters for said VPN connection;

responsive to said loading step, processing an IP datagram for said VPN connection and applying VPN NAT to said IP datagram.

9. An article of manufacture comprising:

a computer useable medium having computer readable program code means embodied therein for operating a virtual private network (VPN) based on IPSec that integrates network address translation (NAT) with IPSec processing to enable two hosts operating in AH or ESP, and in tunnel or transport, modes to establish an IPSec connection across a NAT system, the computer readable program means in said article of manufacture comprising:

computer readable program code means for operating said two hosts in AH or ESP, and in tunnel or transport, modes;

computer readable program code means for causing a computer to effect configuring a plurality of NAT IP address pools;

computer readable program code means for causing a computer to effect configuring plurality of NAT IP address pools and a VPN connection to utilize one of said NAT IP address pools;

computer readable program code means for causing a computer to effect obtaining a specific IP address from a selected one of said NAT IP address pool, and pools, and allocating said specific IP address for said VPN connection prior to execution of an Internet Key Execution (IKE) protocol, a selected address pool determined by type of VPN connection being started;

computer readable program code means, responsive to said allocating, for causing a computer to effect starting said VPN connection, including executing said IKE protocol to generate two local IPSec Security Associations security associations required for said VPN connection and creating a message for IKE containing said IP address from said NAT pool;

computer readable program code means for causing a computer to effect loading to an operating system kernel said IPSec security associations and connection filters for said VPN connection;

computer readable program code means, responsive to said loading, for causing a computer to effect processing an IP datagram for said VPN connection;

computer readable program code means for causing a computer to effect applying VPN NAT to said IP datagram.

10. A method of operating a virtual private network based on Internet protocol (IP) security that integrates network address translation (NAT) with IP security processing to enable two hosts operating in AH or ESP, and in tunnel or transport, modes to establish an IPSec connection across a NAT system, comprising the steps of:

operating said two hosts to execute IPSec in AH or ESP, and in tunnel or transport, modes;

configuring a plurality of NAT IP address pools and a virtual private network connection to utilize one of said NAT IP address pools;

obtaining a specific IP address from a selected one of NAT IP address pools, and allocating said specific IP address for said virtual private network connection prior to execution of an Internet Key Execution (IKE) protocol, said one of said NAT IP address pools being selected responsive to a VPN connection that is starting;

responsive to said allocating, starting said virtual private network connection, including executing said IKE protocol to generate two IPSec security associations required for said VPN connection and creating a message for IKE containing said IP address from said NAT pool;

loading to an operating system kernel said IPSec security associations and connection filters for said virtual private network connection; and responsive to said loading, processing an IP datagram for said virtual private network connection and applying NAT to said IP datagram.

11. A program storage device readable by a machine, tangibly embodying a program of instructions executable by a machine to perform method steps for operating a virtual private network based on IPSec that integrates network address translation (NAT) with IPSec processing to enable two hosts operating in AH or ESP, and in tunnel or transport, modes to establish an IPSec connection across a NAT system said method steps comprising:

operating said two hosts in AH or ESP, and in tunnel or transport, modes;

configuring a plurality of NAT IP address pools and a Virtual private network connection to utilize one of said NAT IP address pools;

obtaining a specific IP address from a selected NAT IP address pool, and allocating said specific IP address for said virtual private network connection prior to execution of an Internet Key Execution (IKE) protocol said selected NAT IP address pool determined by type of VPN connection being started;

responsive to said allocating, starting said virtual private network connection, including executing said IKE protocol to generate two local IPSec security associations required for said VPN Connection and creating a message for IKE containing said IP address from said NAT pool;

loading to an operating system kernel said IPSec security associations and connection filters for said virtual private network connection;

responsive to loading said IPSec security associations and connection filters, processing a an IP datagram for said virtual private network connection and applying NAT to said IP datagram.

* * * * *